Sept. 17, 1929.  G. W. BOWER  1,728,819
PANTOGRAPH CURRENT COLLECTOR
Filed Aug. 12, 1927   2 Sheets-Sheet 2
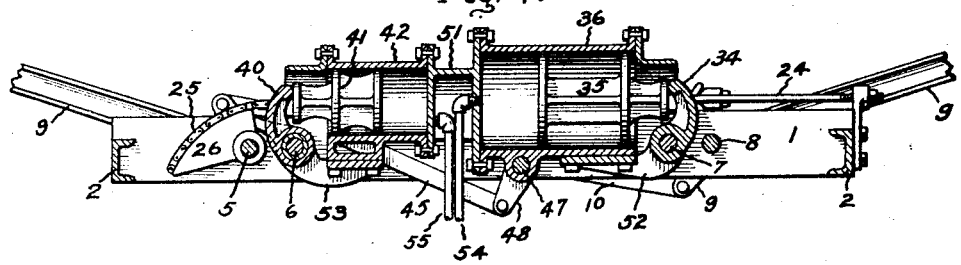
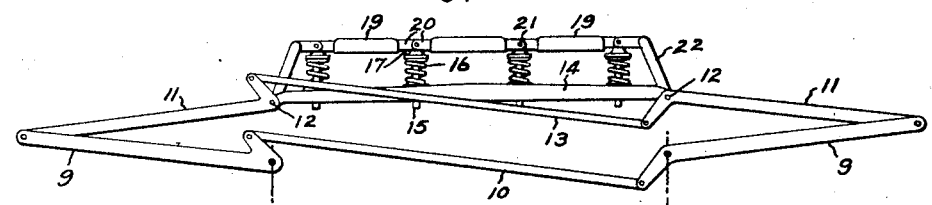
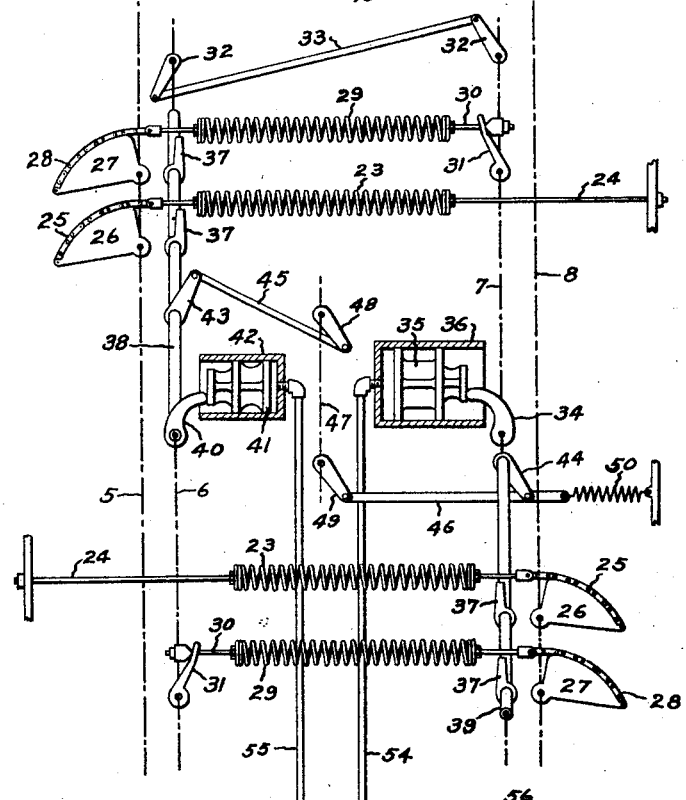
Inventor
George W. Bower,
by *Alexander S. Lenz*
His Attorney.

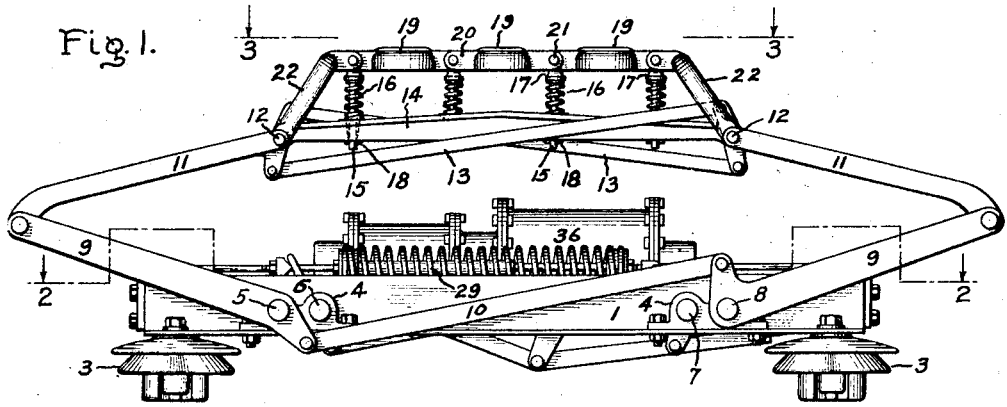
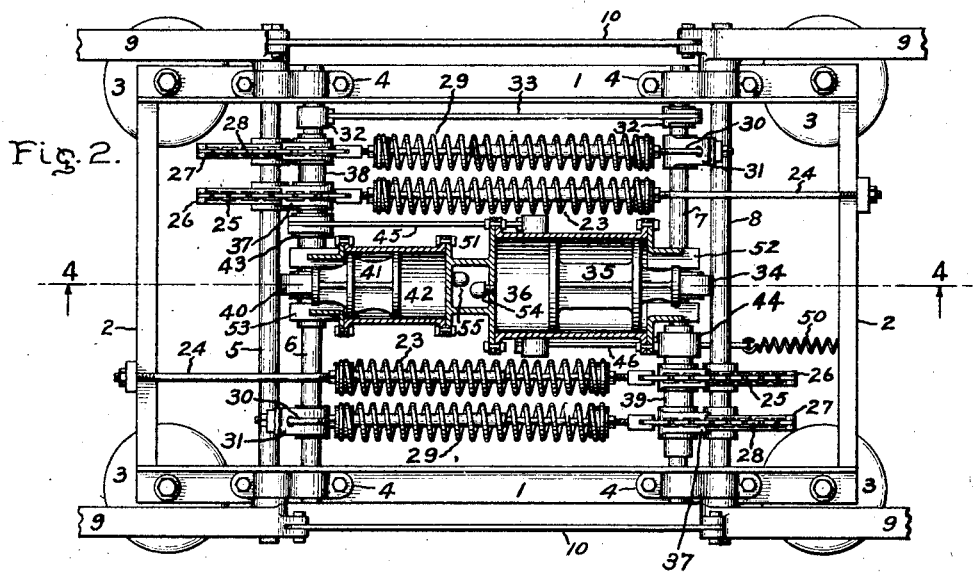
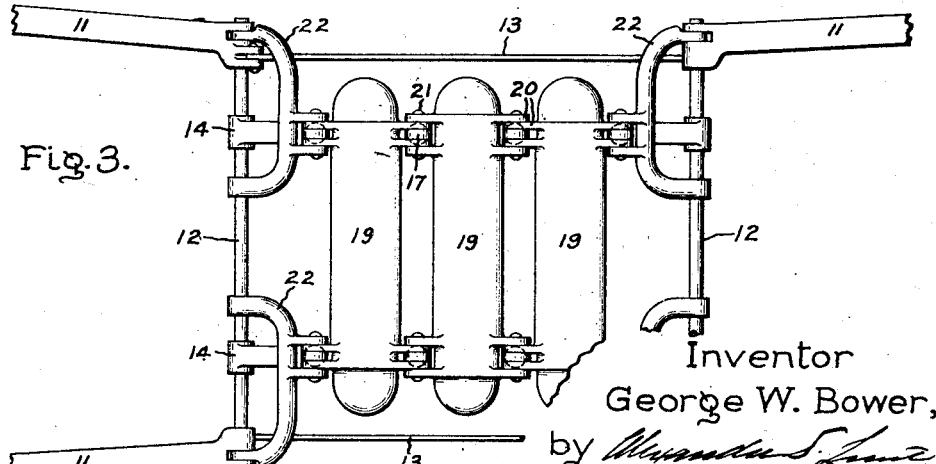

Patented Sept. 17, 1929

1,728,819

UNITED STATES PATENT OFFICE

GEORGE W. BOWER, OF SCHENECTADY, NEW YORK, ASSIGNOR TO GENERAL ELECTRIC COMPANY, A CORPORATION OF NEW YORK

PANTOGRAPH CURRENT COLLECTOR

Application filed August 12, 1927. Serial No. 212,580.

The present invention relates to electric railways and more especially to the means mounted on the tops of railway vehicles for collecting power current from a stationary conductor arranged above the path of travel of the vehicles, such means being commonly known as current collectors especially where the currents collected are relatively large, as on electrified steam railways.

The object of my invention is the provision of an improved overhead current collector which shall be adapted to function properly in connection with a variety of overhead installations of current supply means.

The earlier steam railway electrifications were installed to meet the denser passenger service requirements at and in the vicinity of the terminal stations while the freight service continued to be handled by steam locomotives to yards separate from the passenger stations. On account of the existence of many low overhead structures under bridges and in tunnels through which passenger traffic necessarily passes to reach the populous community centers, the overhead current supply means was necessarily installed at a relatively low elevation. Now that electrification is being installed to care for the freight service, it is necessary to erect the overhead current supply means therefor at levels several feet higher than that already installed for the passenger service on account of the greater height of certain freight cars above that of the standard passenger car. In order that an electric locomotive may be employed for both passenger and freight service, it is accordingly necessary that its current collector shall be adapted to function with both elevations of overhead structures and be easily shiftable from one to the other; also that while operating on the low level overhead contact, it shall be incapable of automatically rising any considerabe distance above the established elevation thereof, as when it passes a gap or hiatus existing in such overhead contact, otherwise it would be likely to catch upon the end of the overhead contact at the far end of the hiatus and cause injury either to the collector or to the overhead contact structure or both. In order to meet this practical condition, I provide the collector with actuating means under the control of the engineer whereby the range of vertical movement thereof is properly regulated to each of the respective levels of the overhead contacts with which it functions.

One embodiment of my invention is shown in the accompanying drawings, in which Fig. 1 is a side elevation of a pantograph collector in lowered position; Fig. 2 is a horizontal section thereof on line 2—2 of Fig. 1 showing the elevating means; Fig. 3 is a plan view of the upper portion of the collector with parts broken away; Fig. 4 is a vertical section of the lower portion of the collector on line 4—4 of Fig. 2; Fig. 5 is a diagrammatic view of the operative parts of the collector, and Fig. 6 is a part elevation and part section of a check valve employed in the air pressure system.

As shown in the drawings, a rectangular frame of angle and channel irons 1 and 2 is supported upon insulators 3 adapted to be mounted upon the roof of a locomotive. On each of the side members 1 of the frame are attached two twin bearing blocks 4 for supporting the ends of four transverse shafts 5, 6, 7 and 8 arranged in pairs. The outermost or pivotal shafts 5 and 8 have rigidly fixed to their extreme ends levers 9 which constitute the lower members of the pantograph. The short arms of the levers 9 on each side of the frame are bent, one up and one down, and their free ends connected by an equalizing link 10, in well known manner, to cause the levers to move in unison.

The outer ends of the long arms of the levers 9 are connected by hinge joints to the corresponding ends of levers 11 which constitute the upper members of the pantograph, and the latter are rigidly connected in pairs at their upper inner ends to two shafts 12. The short arms of the levers 11 are also bent at an angle and those on each side of the collector are connected by an equalizing link 13.

On the shafts 12 of the upper members 11 of the pantograph are loosely mounted two supporting beams 14, each having four spaced vertical apertures for the reception of guide bolts 15 for helical springs 16 which rest upon the upper surface of the beams 14 and thrust against heads 17 at the upper ends of the bolts 15. The bolts are limited in their upward movement under the action of the springs by transverse pins 18 engaging the undersides of the beams 14.

The contact of the collector is a slider pan composed of three sections 19 articulatively connected together in parallel relation by ears 20 and hinge pins 21. The pins 21 also pass through the bolt heads 17 and thereby the pan sections 19 are yieldingly supported by the springs 16. The outermost ears 20 are pivoted to bow or U-shaped guards 22, the legs of which are pivoted upon the shafts 12, as indicated in Fig. 3, so that the outer legs in effect form curved continuations of the upper pantograph members 11 and serve therewith to guide a displaced trolley wire back over the contact pan without injury. The contact pan will be connected, as customary, by flexible conductors (not shown) to the motor circuit of the locomotive.

The weight of the pantograph and parts supported thereby is partially counterbalanced by two helical springs 23 each anchored at one end by a rod 24 to a frame end 2 and connected at the other end by a chain 25 or other flexible connection to a cam arm 26 fixed upon each of the respective shafts 5 and 8 to which the lower pantograph members 9 are also fixed. While the springs 23 serve to support the larger part of the weight of the pantograph, etc., they in no way interfere with its independent actuation and control.

The means for actuating and controlling the movements of the pantograph comprises cam arms 27 shaped and respectively fixed to the rock shafts 5 and 8, like cam arms 26 on the pivotal shafts 5 and 8, and having attached to their free ends flexible connections 28 which are joined to one end of tension springs 29, while the opposite ends of the latter are connected by rods 30 to radial arms 31 fixed upon the respective rock shafts 6 and 7. The shafts 6 and 7 are caused to turn in unison by means of crank arms 32 fixed thereto, one up and one down, and connected at their free ends by a link 33. The shaft 7 has fixed centrally thereto a curved finger 34 adapted to be rotated in opposition to the tension of the springs 29 by a pneumatic piston 35 of relatively large size and operating in a horizontal cylinder 36. Upon completion of a full out stroke of the piston 35, the springs 29 will be fully tensioned and the pantograph elevated until arrested by its pan 19 coming in contact with the overhead contact rail or wire, such as is installed at a high level as over railway tracks used for freight traffic or by stop means to be described.

When it is desirable that current collectors operate in conjunction with an overhead contact rail or wire installed at a lower or intermediate level, as over railway tracks used for passenger traffic only and without freedom to move above the deflecting guards or horns provided at the gap ends of such low level contact rails or wires, the upward rotation of the pantograph members 9 is limited by stop struts 37 fixed upon sleeves 38 and 39 loosely mounted respectively upon the shafts 6 and 7, so that by a slight angular movement of the sleeves the stop struts 37 will be brought into position to engage at their free ends with the heels or inner ends of the cam arms 26 and 28 as they rotate upwardly in the raising of the pantograph. The sleeve 38 is rotated by means of a curved finger 40 secured thereto and acted upon by an auxiliary and relatively small pneumatic piston 41 operating in a horizontal cylinder 42. The sleeve 39 is operated concurrently with sleeve 38 by means of up and down crank arms 43 and 44 respectively fixed to said sleeves and their free ends connected by links 45 and 46 which function as a single link. This special arrangement of links 45 and 46 is made necessary by the disposition of the sleeves 38 and 39 respectively adjacent opposite sides of the frame, and in order to care for this relative set over a transverse shaft 47 journalled in the lower side of the cylinder 36 has fixed to its ends crank arms 48 and 49, the free ends of which respectively connect with the links 45 and 46. The rear end of the link 46 is connected to one end of a light spring 50 which is attached at its other end to an end 2 of the frame. The spring 50 serves to restore the stop struts 37 to their normal inoperative positions upon the release of pneumatic pressure from the cylinder 42.

The cylinders 36 and 42 are rigidly connected by a double head 51 and to the outer ends of the cylinders are bolted brackets 52 and 53 which are transversely apertured for the passage therethrough of the shafts 6 and 7 which thus constitute the supports for the cylinders.

Pneumatic pressure to operate the pistons 35 and 41 is supplied to their respective cylinders 36 and 42 through pipes 54 and 55 tapped through the respective ends of the double head 51 and extending to the air supply pipe 56 provided with two control valves 57 and 58 of the ordinary three-way type and an ordinary check valve 59 to the pipe 54.

When it is desired to raise the current collector to its full height, the control valve 57 is turned to admit compressed air to the main cylinder 36. The check valve 59 serves automatically to prevent the compressed air passing to the auxiliary cylinder.

When it is desired to limit the height to which the collector can move, the valve 57 is opened to exhaust the air from the main cylinder and allow the collector to collapse, then the valve 57 is moved to cut off position and valve 58 opened to admit compressed air which passes to the auxiliary cylinder 42 through pipe 55 and also to the main cylinder 36 through check valve 59 and pipe 54, so that the stop struts 37 are moved by the auxiliary piston 41 into position to arrest the upward swing of the several cam arms 26 and 27 under the pull transmitted thereto by the springs 28 and 29.

Upon moving the control valve 58 to cut off position and opening the other control valve 57 to exhaust position, both pistons 35 and 41 will retract and the stop struts 37 be returned to their inoperative position and the collector descend to its lowermost or inoperative position.

It is apparent that when the locomotive is employed in freight service and where the overhead structures are necessarily high, the driver is able to effect full control of the current collector by operating control valve 57 alone. However, when the locomotive is to be run over tracks designed for passenger service with their relatively low overhead structures, the driver by merely moving the valve 57 into cut-off or idle position has full operative control of the current collector by operating the valve 58, which by reason of its connection to both cylinders insures the movement of the stop struts 37 into position to definitely limit the upward travel of the current collector as it rises under the pressure applied through the main cylinder.

While I have shown and described the best form of the invention known to me, I do not desire to be restricted thereto.

What I claim as new and desire to secure by Letters Patent of the United States is:

1. In a current collector the combination of a vertically movable contact, means freely to actuate said contact through a maximum range of elevation, and control means to limit the range of elevation of said contact.

2. In a current collector the combination of a vertically movable contact, means freely to actuate said contact through a maximum range of elevation, and manually controlled means to limit the range of elevation of said contact.

3. In a current collector the combination of a contact, upper and lower pantograph members to support said contact, means to actuate said pantograph members to elevate said contact through a maximum range of elevation, and control means to limit the range of movement of said pantograph members.

4. In a current collector the combination of a contact, upper and lower pantograph members to support said contact, shafts to pivotally support said lower pantograph members, means connected to said shafts to elevate said contact to maximum operative position, and control means to arrest the pivotal movement of said lower pantograph members and thereby limit the elevation of said contact to an intermediate operative position.

5. In a current collector the combination of a contact, upper and lower pantograph members to support said contact, pivotal shafts to which said lower pantograph members are fixed, cam arms fixed to said shafts, tension means connected to said cam arms, means for actuating said tension means, and displaceable stop struts located in the paths of said cam arms to limit the pivotal movement of said pantograph members.

6. In a current collector the combination of a contact, upper and lower pantograph members to support said contact, pivotal shafts to which said lower pantograph members are fixed, cam arms fixed to said shafts, tension means connected to said cam arms, means for actuating said tension means, rock shafts disposed adjacent said pivotal shafts, stop struts mounted on said rock shafts to arrest the upward movement of said cam arms, and control means for moving said stop struts into and out of arresting relation to said cam arms.

7. In a current collector the combination of a contact, pantograph members for supporting said contact, means for biasing said pantograph members upwardly, operative means for actuating said biasing means, stop struts for limiting the upward movement of said pantograph members, an auxiliary operative means for controlling said stop struts, and means to control both of said operative means.

8. In a current collector the combination of vertically movable pantograph members, supporting beams connecting the upper ends of said pantograph members, a pan contact yieldingly mounted on said supporting beams, and bow guards pivotally connected to the respective corners of said pan contact and to the upper ends of said pantograph members to form extensions thereof beyond the sides of said pan.

In witness whereof, I have hereunto set my hand this 9th day of August, 1927.

GEORGE W. BOWER.